3,553,308
METHOD FOR PREPARING POLYURETHANE MOLDED ARTICLES
Koji Kobayashi, Suita, and Noritoshi Mise, Osaka, Japan, assignors to Takeda Chemical Industries, Ltd., Osaka, Japan
No Drawing. Filed Aug. 7, 1968, Ser. No. 750,756
Claims priority, application Japan, Aug. 7, 1967, 42/50,611
Int. Cl. B29c 13/00
U.S. Cl. 264—305                2 Claims

ABSTRACT OF THE DISCLOSURE

Polyurethane condoms of improved pinhole resistance yet with thickness of less than 50 microns are prepared by alternately dipping, at controlled speed, a condom mold in a polyurethane prepolymer solution and a curing solution, said prepolymer solution being of controlled NCO/OH ratio, molecular weight, viscosity and concentration. The alternate dipping is performed from 3 to 6 times.

---

This invention relates to a method for preparing thin-walled thermosetting polyurethane molded articles by a dip molding technique. More concretely, the invention relates to a method for preparing a thin-walled thermosetting polyurethane molded article which comprises successively dipping a mold into a polyurethane prepolymer and into a curing agent, raising the mold after each dipping, and stripping a thin-walled product from said mold.

So-called dip-molding technique for preparing molded articles has hithertofore been practiced only with rubbers and thermoplastic resins such as polyvinyl chloride. However, when the thermoplastic resins are molded into a shape by the dip-molding technique, a special and expensive solvent such as dimethyl formamide to dissolve the resin must be employed in a large amount and a series of troublesome procedures for recovering the solvent is necessarily required. These drawbacks make the technique quite undesirable from an industrial point of view so far as its application to thermoplastic resins is concerned.

On applying the dip-molding technique to thermosetting resins including rubbers, on the other hand, there has been encountered the defect that gelation of resin composition proceeds even during the dipping procedure and therefore it is quite difficult to carry out the method smoothly and continuously for a rather long period of time. Moreover, upon applying the dip-molding technique to thermosetting resins, it has been hardly possible to prepare a molded article which has an extremely thin wall such as one thinner than about 30 microns, has good mechanical properties and has no pinhole. These drawbacks are found especially where highly reactive thermosetting resins such as unsaturated polyester resin and thermosetting polyurethane resin are employed. In fact, because of these fatal drawbacks, the preparation of extremely thin-walled molded articles of excellent properties has never been carried out by the dip-molding technique with other highly reactive thermosetting resins than rubbers.

A principal object of the present invention is to embody a method of preparing a thin-walled thermosetting polyurethane molded article of excellent properties by the dip-molding technique, smoothly and continuously for a long period of time.

Another object of the present invention is to provide a method for preparing a thin-walled thermosetting polyurethane molded article having no pinholes, and having excellent mechanical and chemical properties.

Still another object of this invention is to provide a suitable method for preparing thin-walled tubular articles such as condoms, operating gloves, finger sacks and balloons by dip-molding technique with thermosetting polyurethane resin.

Other objects and advantages of the present invention will become apparent from the following description.

The present invention is embodied by employing two baths, one containing a polyurethane prepolymer component and the other containing a curing agent and by dipping a mold in the two baths in turn, raising the mold therefrom after each dip. Regarding the sequence of such dipping and raising, it is optional which of the baths precedes the other, but when the viscosity of the polyurethane prepolymer is so high that the layer coated by dipping and raising in the prepolymer bath is more than about 100 microns in thickness, it is desirable to complete the dipping and raising cycle with the curing bath.

The mold to be used may be made of any material and may be of any shape insofar as it serves the intended purpose, but is of course advisable to avoid the use of such materials as will permit penetration of the materials into the substance of the mold.

Polyurethane prepolymer and a curing agent may be used as such if the mold can be freely dipped in and raised out of them, but generally the polyurethane prepolymer is used as an about 1 to 80, advantageously 5 to 60, more optimally 10 to 30 weight percent solution, and the curing agent, especially when using a polyamine, is used as an about 0.01 to 10, advantageously 0.25 to 1 weight percent solution.

The desirable viscosity of the prepolymer is about 0.7 to 20 centipoise(s) and the desirable speed of raising the mold is 200 to 1000 mm./min., more desirably 300 to 500 mm./min.

While the dipping and raising may be conducted at room temperature (15° to 30° C.), it can also be conducted at an elevated temperature such as 40° to 100° C. And where a solvent is used, it is desirable to follow the procedure for removing the solvent from the mold before the subsequent dipping is conducted.

The present method can most advantageously be applied to the preparation of condoms. Hithertofore, condoms have been produced from rubber. However, known condoms are generally of a thickness of more than 50 microns, and when the thickness is intended to be less than 50 microns, it is unavoidable that there is formed pinholes and tensile strength and elongation are lowered. In contrast, the present invention makes possible the fabrication of condoms having a wall thickness less than 50 microns, or even a wall thickness of 20 to 30 microns, with no pinholes, and with high tensile strength and elongation.

In the present method, it is no longer necessary to take pot life into consideration nor is it necessary to employ a special and expensive solvent such as dimethyl formamide. Furthermore, the thickness of the thin-walled article can also be freely changed by varying the resin concentration or times of the dipping, or by raising the speed of the mold, or by the incorporation of, for instance, a curing-accelerator or curing retarder, either in the resin or in the curing agent.

The polyurethane prepolymer employed in this invention includes isocyanato-terminated, hydroxyl-terminated and amino-terminated polyurethane prepolymers.

The isocyanato-terminated polyurethane prepolymers are prepared by reacting polyether polyols or polyester polyols having an average molecular weight within the range of from about 500 to 5000, advantageously from 800 to 3000, and having a hydroxyl number from about 30 to 500, desirably from about 40 to 200, with polyisocyanate compounds in the NCO/OH ratio of more than 1/1, optimally from 1.5/1 to 2.5/1.

It is desirable that said dipping into and raising out of the two baths be repeated more than 2 times, practically 3 to 6 times, to obtain a uniform thin-walled article having no pinholes.

Finally, after the last raising, the polyurethane layer on the surface of the mold is dried thoroughly at room temperature or at an elevated temperature such as 40 to 120° C. followed by stripping the so-formed thin-walled article.

In the method of the present invention, there are at first formed a thin layer of the polyurethane prepolymer and a thin layer of the curing agent in successive coats on the surface of the mold, and then there arises a sufficient mutual dissolution and diffusion between the two layers to produce a completely cured polyurethane molded article.

The product obtainable in the described manner offers a rich variety of film characteristics. Thus, there can be obtained varieties of film ranging, for instance, from a film as thin as several microns to a crepe film.

As suitable polyether polyols, there can be used polyether polyols obtainable by reacting alkylene oxide (e.g. ethylene oxide, propylene oxide, butylene oxide, etc.) with glycol (e.g. ethylene glycol, propylene glycol, butylene glycol, etc.), triol (e.g. glycerin, trimethylol propane, hexanetriol, etc.), hexaol (e.g. sorbitol), or the like.

As suitable polyester polyols, there can be used polyester polyols obtainable by reacting dicarboxylic acid (e.g. oxalic acid, glutaric acid, adipic acid, maleic acid, fumaric acid, phthalic acid, isophthalic acid, terephthalic acid) with the above mentioned glycols, triols, hexaols or the like.

Any suitable polyisocyanate compounds can be used such as 2,4-tolylene diisocyanate, 2,6-tolylene diisocyanate or a mixture thereof, phenylene diisocyanate, 4,4'-diphenyl methane diisocyanate, 4,4'-diphenyl diisocyanate, 4 - chlorometaphenylene-1,4-cyclohexane diisocyanate, 1,6-hexamethylene diisocyanate, 1,4-tetramethylene diisocyanate, m- or p-xylylene diisocyanate, 1-methylbenzol - 2,4,6-triisocyanate, biphenyl-2,4,4'-triisocyanate and the like.

The amino-terminated polyurethane prepolymers can be obtained by the reaction of the above polyurethane prepolymer with a large excess of polyamine, such as aliphatic diamine (e.g. ethylene diamine, propylene diamine, trimethylene diamine, tetramethylene diamine, etc.), aromatic diamine (e.g. tolylene diamine, phenylene diamine, 4,4'-diamino diphenyl methane, m- or p-xylylene diamine, etc.), alicyclic diamine (e.g. piperidine, cyclohexyl diamine, etc.), hydrazine, ammonia, diethylene triamine, 1,2,4-triamino benzene, and the like.

The hydroxyl-terminated polyurethane prepolymers can be obtained by the reaction of the above said polyether polyols or polyester polyols with the polyisocyanates in an NCO/OH ratio of less than 1/1, practically 1/3 to 2/3.

The said polyether polyurethane prepolymer and polyester polyurethane prepolymer can be used singly or in combination. For example, a mixture of 1 weight part of prepolymer prepared by reacting poly(oxyethylene)glycol with tolylene diisocyanate and 2 to 4 weight parts of prepolymer prepared by reacting poly-ε-caprolactone diol with tolylene diisocyanate can be successfully employed.

As the curing agent, when an isocyanato-terminated polyurethane prepolymer is used as the prepolymer component, use can be made of, for example, polyamine such as aliphatic diamine (e.g., ethylene diamine, propylene diamine, trimethylene diamine, tetramethylene diamine, hexamethylene diamine etc.), aromatic diamine (e.g. tolylene diamine, phenylene diamine, 4,4'-diamino-diphenylmethane, xylylene diamine, etc.), alicyclic diamines (e.g. piperidine, cyclohexyl diamine, etc.), hydrazine, ammonia, diethylene triamine, 1,2,4-triamino benzene, etc., polyol such as ethylene glycol, propylene glycol, butylene glycol, trimethylol propane, hexanetriol, pentaerythritol, poly(oxypropylene)glycol, sorbitol, etc. When polyurethane prepolymers having terminal hydroxyl or amine groups are employed, use can be made, as a curing agent, of polyisocyanate such as 2,4 or 2,6-tolylene diisocyanate, phenylene diisocyanate, 4-chlorometaphenylene diisocyanate, 1-6-hexamethylene diisocyanate, tetramethylene diisocyanate, 1,4-cyclohexane diisocyanate, naphthylene diisocyanate, m- or p-xylylene diisocyanate and the like.

Solvents employable as the diluent for the polyurethane prepolymer and curing components are those which react neither with the polyurethane prepolymer nor with the curing agent and do not appreciably dissolve the cured product. A solvent having a rather low boiling point gives better results. Typical examples of solvents usable include aliphatic hydrocarbons, e.g. n-hexane, n-pentane; aromatic hydrocarbons, e.g. benzene, toluene, xylene; halogenated hydrocarbons, e.g. 1,1,1-trichloroethane; esters, e.g. ethyl acetate; ethers, e.g. ethyl ether; ketones, e.g. methylethyl ketone, acetone, etc.

Any catalyst can be employed insofar as it does not adversely affect the reaction; examples of catalysts are stannous octoate, dibutyl-tin dilaurate, etc. The use of the catalyst is especially desirable in cases of a reaction between a hydroxyl-terminated polyurethane prepolymer and a polyisocyanate curing agent, and a reaction between an isocyanato-terminated polyurethane prepolymer and a polyol curing agent.

The following examples are illustrative of presently preferred exemplary embodiments of this invention. In these examples, parts by weight bear the same relationship to parts by volume as do grams to milliliters.

EXAMPLE 1

14.8 parts by weight of poly(oxypropylene)glycol having an average molecular weight of 1000 and an OH number of about 112 is reacted with 5.2 parts by weight of tolylene diisocyanate (a mixture of 80% 2,4-isomer and 20% 2,6-isomer), and 20 parts by weight of the resulting isocyanato-terminated polyurethane prepolymer is diluted with 100 parts by weight of ethyl acetate to prepare a prepolymer solution, which is used as a resin bath. A 1% solution of ethylene diamine in n-hexane is used as a curing bath. A mold after which a balloon is to be fashioned is dipped in the curing bath for 3 seconds, at the end of which time it is raised out of the bath at a speed of 500 mm./min and dried for 30 seconds in the atmosphere at 30° C., 35% R.H. Then the mold is dipped in the resin bath for 30 seconds, whereby the curing reaction between the curing agent and resin is allowed to be completed. The above procedure is repeated once more, followed by stripping the molded article from the mold.

The thin-walled polyurethane molded article prepared in the above manner is about 10 microns in thickness. After one hour's heat-treatment at 80° C. to completely remove the solvent, the physical properties of the molded article are 300% in elongation and 200 kg./cm.$^2$ in tensile strength.

EXAMPLE 2

34.1 parts by weight of poly-ε-caprolactone diol having an average molecular weight of 2000 and an OH number of 56 is reacted with 5.9 parts by weight of tolylene diisocyanate (a mixture of 80% 2,4-isomer and 20%, 2,6-isomer), and 40 parts by weight of the resulting isocyanato-terminated polyurethane prepolymer is diluted with 100 parts by weight of acetone to prepare a resin bath. On the other hand, a curing bath is prepared by dissolving 5 parts by weight of a curing agent composed of 0.7 mole part of 1,4-butylene diol and 0.3 mole part of triisopropanol amine in 100 parts by weight of n-hexane and by adding to the solution 1 part by weight of stannous octoate as a cure-accelerator.

A mold after which an operating glove is to be fashioned is dipped in the resin bath for 3 seconds, at the end of which time the mold is raised out of the bath at a speed of 300 mm./min. and dried for 1 minute in the atmosphere at 30° C., 35% R.H. Then the same mold is dipped in the curing bath for 1 minute so that the curing reaction is allowed to take place, followed by drying in the same atmosphere as above. The above procedure is repeated once more, and a thin-walled article of about 100 microns in thickness is stripped from the mold. After one hour's heat treatment at 100° C. to completely remove the solvent, the physical properties of the article are 200% in elongation and 100 kg./cm.$^2$ in tensile strength.

EXAMPLE 3

Poly(oxypropylene)glycol having an average molecular weight of 1000 and an OH number of about 112 is reacted with m-xylylene diisocyanate in a molar ratio of 1:2 and 50 parts by weight of the resulting isocyanato-terminated polyurethane prepolymer is dissolved in 100 parts by weight of benzene to prepare a resin bath. On the other hand, 1 part by weight each of m-xylylene diamine and ethylene diamine is dissolved in 100 parts by weight of n-hexane to prepare a curing bath. A mold after which a finger sack is to be fashioned is dipped in the curing bath for 5 seconds, and after being raised at a speed of 500 mm./min. and drying for 30 seconds in the atmosphere at 30° C., 35% R.H., the mold is dipped in the resin bath for 3 seconds, at the end of which time the mold is raised and dried under the same conditions as above.

The same mold is then dipped in the curing bath for another minute, followed by raising and drying after the same manner as above. The polyurethane article stripped from the mold is a film having a crepe surface. The physical properties of the film are 200% in elongation and 100 kg./cm.$^2$ tensile strength. And even after treatment with a Weather-O-Meter for 24 hours, there is observed no yellow coloring on the film.

EXAMPLE 4

17 parts by weight of the hydroxyl-terminated polyethylene-adipate having an average molecular weight of 2000 and an OH number of 56 is reacted with 3 parts by weight of tolylene diisocyanate (a mixture of 80% 2,4-isomer and 20% 2,6-isomer). 20 parts by weight of the resulting isocyanato-terminated polyurethane prepolymer is diluted with 100 parts by weight of ethyl acetate to prepare a resin bath. On the other hand, a 0.25% solution of m-xylylene diamine in n-hexane is used as a curing bath.

A mold after which a condom is to be fashioned is dipped in the resin bath for 30 seconds, at the end of which time it is raised out of the bath at a speed of 400 mm./min., and dried for 30 seconds in the atmosphere at 30° C. and 35% R.H. Then the mold is dipped in the curing bath for 30 seconds, followed by raising at the same speed, and dried under the same conditions as above.

One course of dipping in the resin and raising out of the curing bath gives polyurethane film having about 5 microns in thickness. This course is repeated five times.

Finally, the cured polyurethane article is stripped from the mold. The article prepared in this manner is colorless, transparent and about 25 microns in thickness. The physical properties of the product are as follows:

1.—Tensile strength and elongation

TABLE 1

| Sample | Thickness (μ) | Tensile strength (Kg./cm.$^2$) | Elongation (percent) |
|---|---|---|---|
| Prepared by this example | 25 | 500 | 800 |
| Commercially available rubber article (Control) | 55 | 300 | 830 |

2.—Test of protein dialysis

Method: Each sample dipped in 300 ml. of distilled water for 18 hours, after which time bull seminal plasma dialyzed into the distilled water is determined by UV absorption spectrum analysis.

Result:

TABLE 2

| Sample (thickness) | Optical density | |
|---|---|---|
| | E-280 [1] | E-260 [2] |
| Produced by this example (25μ) | 0.007 | 0.002 |
| Commercially available rubber [3] article (55μ) | 0.008 | 0.005 |
| Cellophane tube [4] (control) (30μ) | 0.190 | 0.270 |

[1] The plasma sample showing a maximum absorption at the wave of 280 mμ.
[2] The plasma sample showing a maximum absorption at the wave of 260 mμ.
[3] The same article as used in Test 1.
[4] Visking seamless cellulose tube manufactured by Visking Co. Ltd., in U.S.A.

The cellophane tube employed as a control hardly dialyzes the plasma. Therefore, Table 2 shows that the article prepared by this invention is remarkably excellent in preventing dialysis of the plasma.

EXAMPLE 5

Polyurethane prepolymer used in Example 1 and that used in Example 3 are blended in a molar ratio of 1:2. 20 parts of the blended polyurethane prepolymer is diluted with 100 parts by weight of ethyl acetate to prepare a resin bath. On the other hand, a 0.25% solution of m-xylylene diamine is used as a curing bath.

Dip-molding processes are conducted after the manner described in Example 4, and a condom of 25 microns in thickness is obtained.

What is claimed is:

1. A method for producing a polyurethane condom of less than 50 microns in thickness which comprises
   (a) providing 1 weight percent to 80 weight percent solution in an inert solvent of polyurethane prepolymer produced by reacting polyether polyols or polyester polyols having an average molecular weight within the range of from about 500 to 5000 and a hydroxyl number from about 30 to 500, with polyisocyanate compound in the NCO/OH ratio of more than 1/1, said polyurethane prepolymer solution having a viscosity of from 0.7 to 20 centipoises;
   (b) providing a 0.01 weight percent to 10 weight percent solution of a curing agent for said prepolymer in an inert solvent;
   (c) dipping a mold on which a condom is to be fashioned into the polyurethane prepolymer solution, raising the mold out of the polyurethane prepolymer solution at the speed of 200 to 1000 mm./min. to deposit a film of said solution upon said mold;
   (d) curing said prepolymer by dipping the film covered mold into the curing agent solution and raising the mold out of the curing agent solution;
   (e) performing said dipping and raising cycle in the polyurethane prepolymer solution and the curing agent solution from 3 to 6 times, whereby a cured polyurethane film is formed on the mold;

(f) drying the cured polyurethane film on the mold; and
(g) stripping the polyurethane condom from the mold;

2. A method for producing polyurethane condom according to claim 1, wherein the polyurethane prepolymer solution of (a) is a 5 weight percent to 60 weight percent solution, the curing agent solution of (b) is a 0.25 weight percent to 1 weight percent solution and the speed of raising the mold out of the polyurethane prepolymer solution of (c) is 300 to 500 mm./min.

References Cited

UNITED STATES PATENTS 2,814,834  12/1957  Hess et al. _____ 264—307

DONALD J. ARNOLD, Primary Examiner

J. R. HALL, Assistant Examiner

U.S. Cl. X.R.

264—307